(12) United States Patent
Hannen et al.

(10) Patent No.: US 6,210,093 B1
(45) Date of Patent: Apr. 3, 2001

(54) TRANSFER APPARATUS FOR A PLURALITY OF OBJECTS

(75) Inventors: Reiner Hannen, Goch; Frank Michels, Kleve; Norbert Vermeulen, Kleve-Warbeyen, all of (DE)

(73) Assignee: MSK-Verpackungs-Systeme Gesellschaft mit Beschrankter Haftung, Kleve (DE)

( * ) Notice: Subject to any disclaimer, the term of this patent is extended or adjusted under 35 U.S.C. 154(b) by 0 days.

(21) Appl. No.: 09/235,656

(22) Filed: Jan. 22, 1999

(30) Foreign Application Priority Data

Jan. 24, 1998 (DE) .......................................... 298 01 158 U

(51) Int. Cl.⁷ .................................................... B65H 5/08
(52) U.S. Cl. .................. 414/226.01; 212/319; 294/87.1; 198/468.2; 414/226.05
(58) Field of Search ........................ 414/225.01, 226.01, 414/226.05, 222.12, 744.3, 626, 627; 198/468.2, 468.4, 468.5; 294/87.1; 212/319, 333

(56) References Cited

U.S. PATENT DOCUMENTS

| | | | |
|---|---|---|---|
| 2,807,493 | * 9/1957 | Ryan et al. | 294/87.1 X |
| 2,858,009 | * 10/1958 | Bainbridge | 294/87.1 X |
| 3,021,963 | * 2/1962 | Kasdorf et al. | 212/319 |
| 3,221,910 | * 12/1965 | Izumi | 414/744.3 X |
| 3,722,709 | * 3/1973 | Buschmann | 414/744.3 X |
| 4,419,039 | * 12/1983 | Bengtsson | 414/225.01 X |

FOREIGN PATENT DOCUMENTS

| | | |
|---|---|---|
| 1 991 137 | 2/1968 | (DE) . |
| 33 43 990 | 6/1985 | (DE) . |
| 297 10 546 U | 10/1997 | (DE) . |
| 0412373 | 2/1991 | (EP) . |
| 0550114 | 7/1993 | (EP) . |
| WO 95/30615 | 11/1995 | (EP) . |
| 2 143 490 | 2/1985 | (GB) . |
| 181568 | 12/1985 | (HU) . |
| 183703 | 4/1987 | (HU) . |

* cited by examiner

*Primary Examiner*—Donald W. Underwood
(74) *Attorney, Agent, or Firm*—Herbert Dubno; Andrew Wilford

(57) ABSTRACT

An apparatus for displacing a plurality of objects from a pickup station to a deposition station offset horizontally from the pickup station has a support movable in a horizontal transport direction between a position directly above the pickup station and a position directly above the deposition station, an elongated lift plate underneath the support and provided with grabs for picking up and releasing the objects, a flexible belt having a lower end extending in the direction and secured to the lift plate, a drive on the support for paying out and winding in the belt and thereby raising and lowering the plate, and rigid links connected between the plate and the support for inhibiting movement of the plate perpendicular to the direction.

8 Claims, 4 Drawing Sheets

TRANSFER APPARATUS FOR A PLURALITY OF OBJECTS

FIELD OF THE INVENTION

The present invention relates to an apparatus for picking up and horizontally transporting a plurality of objects. More particularly this invention concerns a device for shifting a group of bottles or the like from one location to a nearby location horizontally offset therefrom.

BACKGROUND OF THE INVENTION

A standard transfer apparatus of the above-described type is typically used to load a group containing a predetermined number of bottles or other objects onto a pallet or case. An input conveyor brings the bottles into a pickup station where they are grouped in a dense array, each bottle assuming a predetermined position. Then the transfer device picks up all the bottles and moves them in a horizontal transport direction to a deposition station where they are set down, for instance positioned in the pockets of a group of six-pack containers themselves sitting a cardboard case.

Such an apparatus must be perfectly vertically aligned with the objects as they are being picked up and with the pallet or case into which they are being set. At the same time it must be able to move fairly rapidly to keep up with the upstream and downstream equipment.

While the obvious way to ensure such accurate positioning is to provide a rigid guide framework on which the lift plate can move vertically, such a solution is clearly not advisable because the extra mass is difficult to start, stop, and move rapidly. Thus recourse is made to solutions which provide the desired accurate positioning while being less massive.

In one known solution the lift plate, which typically has a plurality of suction grabs or grab bars for lifting the bottles or other objects, is carried at the lower end of four wide belts that are wound up on respective rollers on the outer end of a horizontally movable arm or carriage. The roller axes form a rectangle and the rollers are connected to each other for synchronous operation by right-angle drives so all of the belts are payed out and wound up at the same speed. Since each such wide belt is relatively stiff parallel to its plane, the result is that the lift plate remains fairly accurately positioned underneath the carriage. The considerable disadvantage of this solution is that the belts completely contain all the structure between the top of the lift plate and the bottom of the carriage, making servicing this equipment extremely difficult.

In another known solution the lift plate is carried on parallelogrammatic linkages whose links are connected together by sector gears so that they all extend and retract synchronously. Such an arrangement works fairly well, but is prone to considerable wear due to its complex mechanics. Once the sector gears and bearings start to wear, action becomes sloppy and the lift plate's position shifts relative to the overlying structure.

OBJECTS OF THE INVENTION

It is therefore an object of the present invention to provide an improved transfer apparatus.

Another object is the provision of such an improved transfer apparatus which overcomes the above-given disadvantages, that is which is of simple construction, which gives ample access to its parts so as to be easy to maintain and service, and which has a long service life.

SUMMARY OF THE INVENTION

An apparatus for displacing a plurality of objects from a pickup station to a deposition station offset horizontally from the pickup station has according to the invention a support movable in a horizontal transport direction between a position directly above the pickup station and a position directly above the deposition station, an elongated lift plate underneath the support and provided with grabs for picking up and releasing the objects, a flexible belt having a lower end extending in the direction and secured to the lift plate, a drive on the support for paying out and winding in the belt and thereby raising and lowering the plate, and rigid links connected between the plate and the support for inhibiting movement of the plate perpendicular to the direction.

Thus this arrangement ensures that the plate will move horizontally with the support, not swaying or twisting, and will therefore be able to pick up and set down the objects being transported. At the same time the area between the plate and the support is left mainly open for easy access to the various parts in this area so they can be serviced, lubricated, and so on.

The plate according to the invention is rectangular and has side edges extending generally parallel to the direction. The apparatus has two such belts each connected to the drive and each having a lower edge connected to a respective one of the side edges. Normally each of the belts has a width generally equal to a length of the respective side edge.

The drive includes a coupling element such as a chain or belt for synchronously paying out and winding in the belts and thereby maintaining the plate horizontal. This coupling element can be connected between rollers on which the belts are wound.

The links in accordance with the invention are pivoted on each other, on the plate, and on the support about generally parallel axes which can be perpendicular to the movement direction to most effectively inhibit movement in this direction.

In another system according to the invention the belt is attached centrally to the plate. As in the other above-described system, here the links are connected together in scissor linkages.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
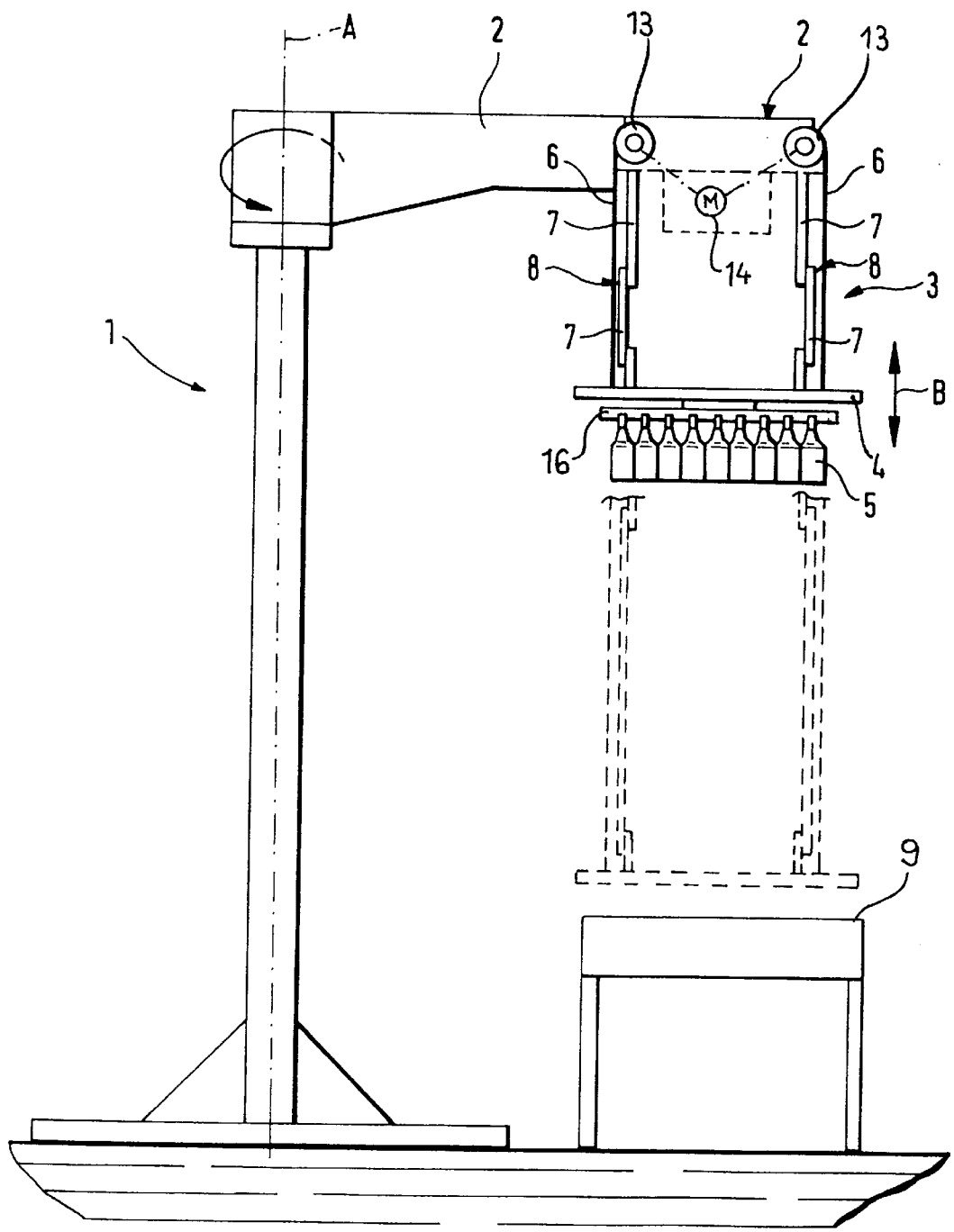
FIG. 1 is a small-scale and partly diagrammatic side view of the apparatus according to the invention.
Figure 2:
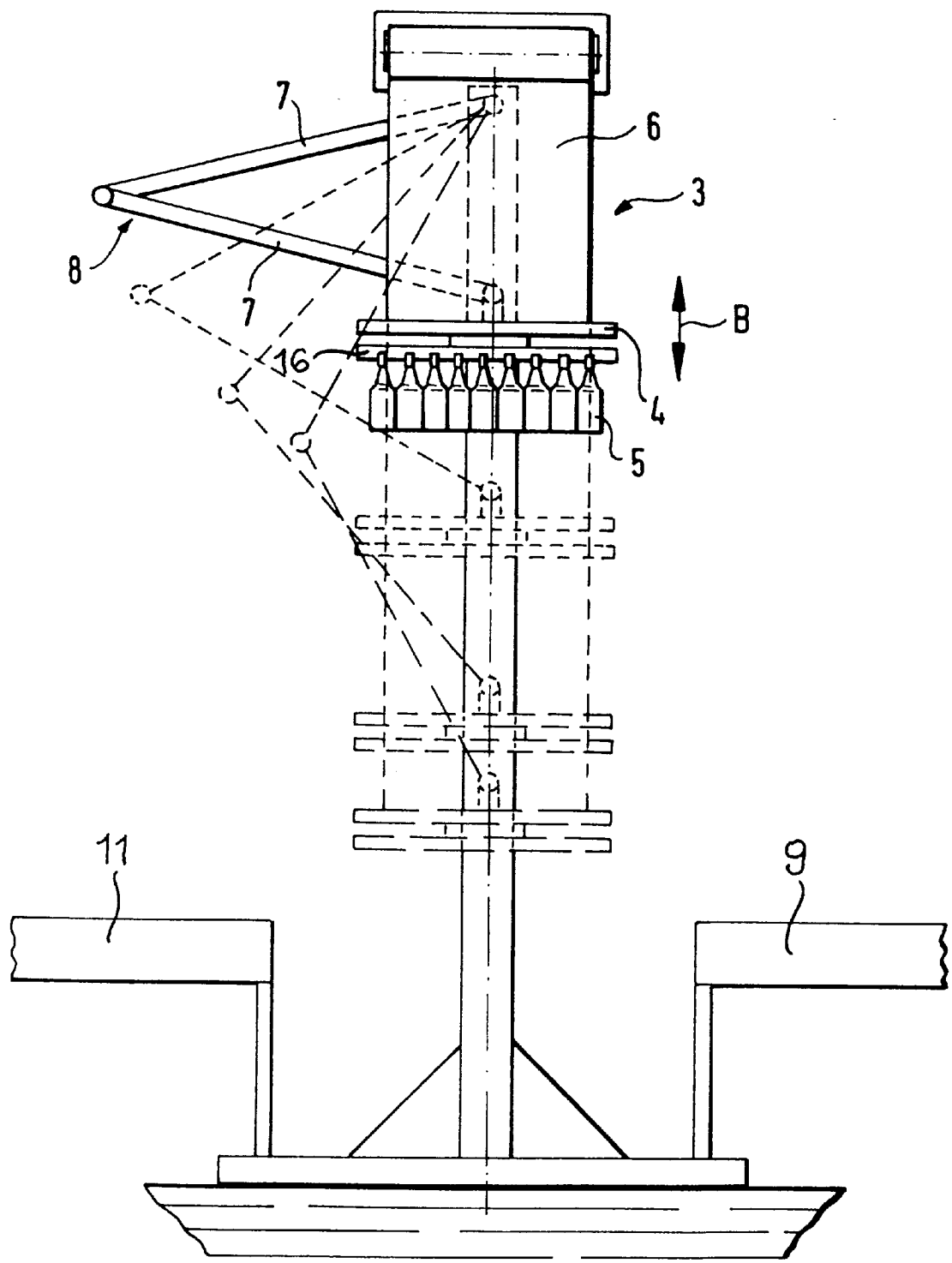
FIG. 2 is an end view of the apparatus.
Figure 3:
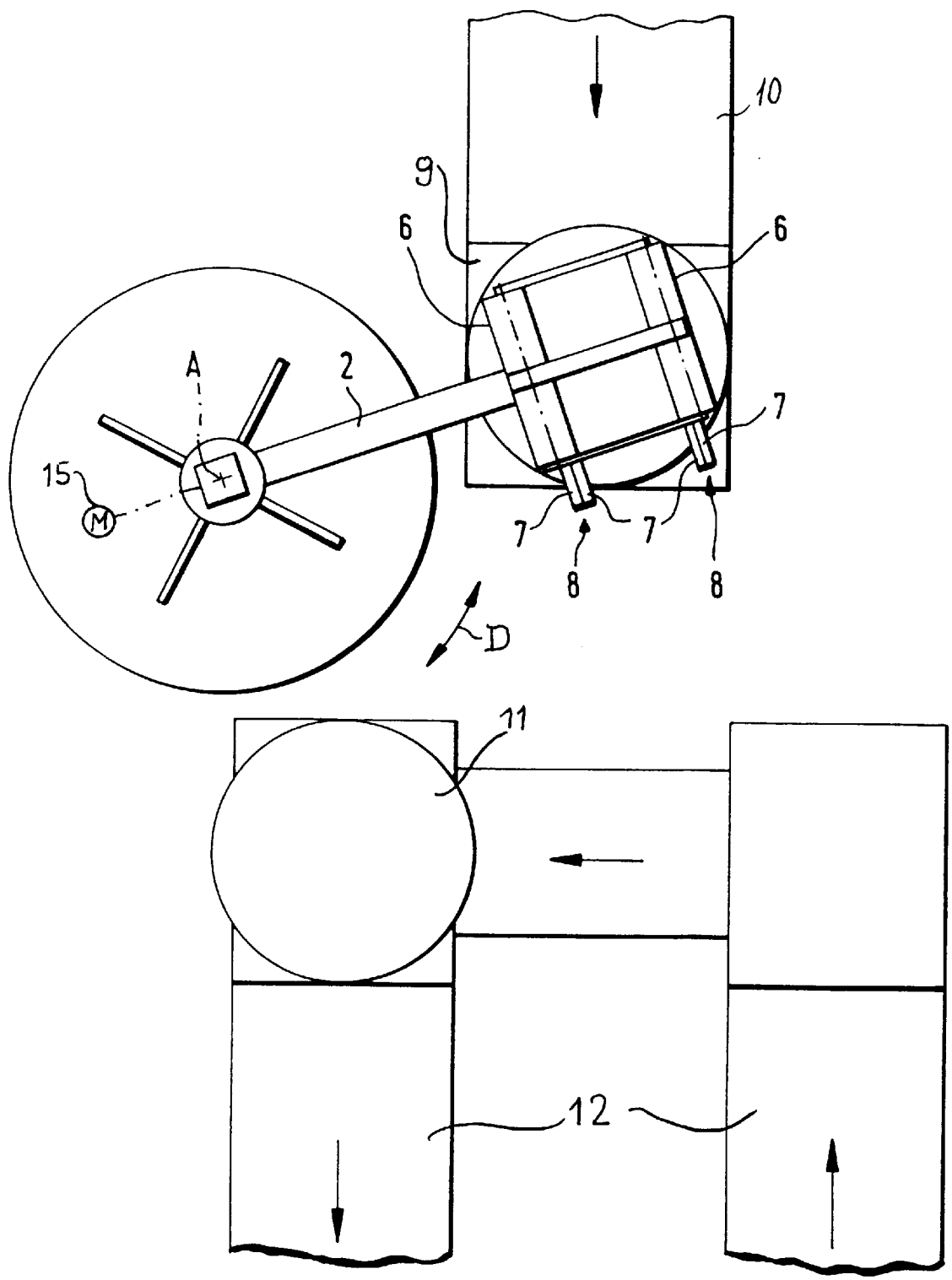
FIG. 3 is a top view of the apparatus.

As seen in the drawing, a transfer apparatus 1 serves to move groups of objects, here bottles 5, from a pickup station 9 formed at a downstream end of an input conveyor 10 to an output or deposition station 11 formed by a pallet or case conveyor 12. The apparatus 1 comprises a support arm 2 pivotal at its inner end about an upright axis A by means of a motor illustrated schematically at 15 and carrying at its outer end a pickup device 3 having a vertically displaceable pickup head or plate 4 provided with suction grippers or strips 16 that can engage and lift the array of bottles 5.

This plate 4 is basically rectangular and horizontal. It has two long sides extending generally tangentially of a transport direction D, which itself extends angularly of the axis A. Two wide belts 6 each have a lower end attached to a respective one of these long sides and are spanned at their upper ends over respective rollers 13 that are synchronously oppositely driven by a transmission drive unit shown schematically at 14. Thus the plate 4 is effectively hung on two planar stretches of these belts 6 which, while being capable of being rolled up, are fairly stiff parallel to their vertical planes so that the plate 4 will effectively be blocked against moving relative to the arm 2 in the direction D.

In addition a pair of scissor linkages 8 are provided, each formed by upper and lower stiff arms 7. The lower end of the lower arm 7 is pivoted on the plate about a horizontal axis perpendicular to the direction D, its upper end is pivoted on the lower end of the respective upper arm 7, and the upper end of this upper arm is pivoted on the arm 2. Thus these linkages 8 effectively prevent the plate 4 from moving perpendicular to the direction D relative to the arm 2 while still permitting it to be moved up and down as the belts 6 are payed in and out.

Figure 4:
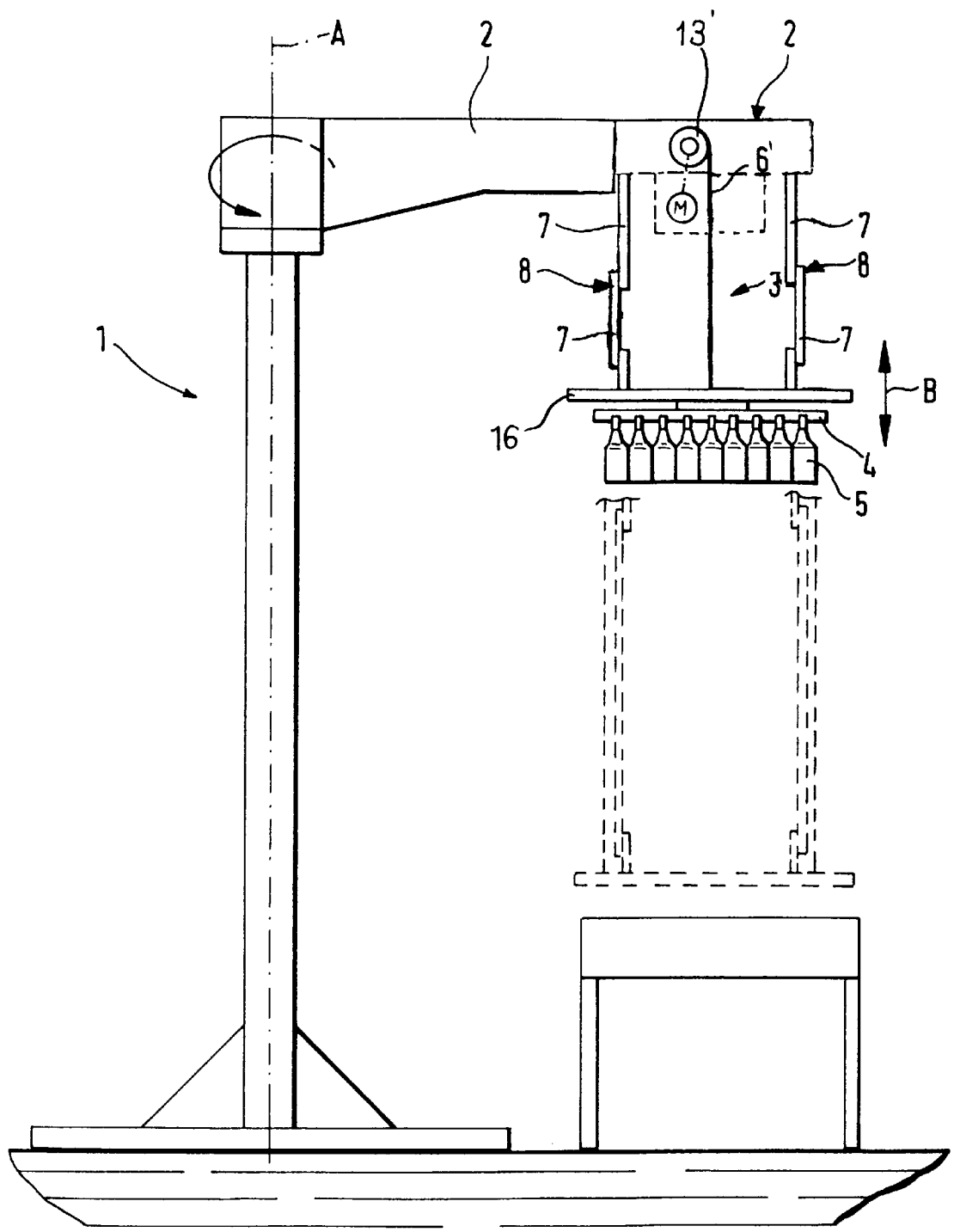
FIG. 4 is a view of a detail of an alternative arrangement in accordance with the invention.

FIG. 4 shows how, instead of a pair of belts 6, only one belt 6' wound over a single roller 13' is used. The lower end of this belt 6' is centrally attached to the plate 4. Here the linkages 8 also serve to keep the plate 4 horizontal.

With this system as shown in FIG. 1, however, access to the inside of the device is clearly possible. The combination of the belts 6 and the scissor linkages 8 ensures however that the lift plate 4, even when its lowermost position, will remain perfectly aligned under the outer end of the arm 2 and will not move parallel or transversely to the transport direction D.

We claim:

1. An apparatus for displacing a plurality of objects from a pickup station to a deposition station offset horizontally from the pickup station, the apparatus comprising:

a support movable in a horizontal transport direction between a position directly above the pickup station and a position directly above the deposition station;

an elongated lift plate underneath the support and provided with grabs for picking up and releasing the objects;

a flexible wide belt having a wide lower end extending in the direction and secured to the lift plate;

drive means on the support for paying out and winding in the belt with a lower stretch of the belt in a plane generally parallel to the direction and thereby raising and lowering the plate; and stabilizing means including rigid links connected between the plate and the support for inhibiting movement of the plate perpendicular to the direction.

2. The apparatus defined in claim 1 wherein the plate is rectangular and has side edges extending generally parallel to the direction, the apparatus having two such belts each connected to the drive means and each having a lower edge connected to a respective one of the side edges.

3. The apparatus defined in claim 2 wherein each of the belts has a width generally equal to a length of the respective side edge.

4. The apparatus defined in claim 2 wherein the drive means synchronously pays out and winds in the belts and thereby maintains the plate horizontal.

5. The apparatus defined in claim 1 wherein the links are pivoted on each other, on the plate, and on the support about generally parallel axes.

6. The apparatus defined in claim 5 wherein the belt is attached centrally to the plate.

7. The apparatus defined in claim 5 wherein the axes of the links are generally perpendicular to the direction.

8. An apparatus for displacing a plurality of objects from a pickup station to a deposition station offset horizontally from the pickup station, the apparatus comprising:

a support movable in a horizontal transport direction between a position directly above the pickup station and a position directly above the deposition station;

an elongated and generally rectangular lift plate underneath the support, having sides edges extending generally parallel to the direction, and provided with grabs for picking up and releasing the objects;

respective flexible wide belts having wide lower ends extending in the direction and secured to the side edges of the lift plate and each having a width generally equal to a length of the respective side edge;

drive means on the support for paying out and winding in the belt with a lower stretch of the belt in a plane generally parallel to the direction and thereby raising and lowering the plate; and stabilizing means including rigid links connected between the plate and the support for inhibiting movement of the plate perpendicular to the direction.

* * * * *